(No Model.) 2 Sheets—Sheet 1.
O. B. SHALLENBERGER.
WATT METER FOR MULTIPHASE ALTERNATING ELECTRIC CURRENTS.
No. 531,869. Patented Jan. 1, 1895.
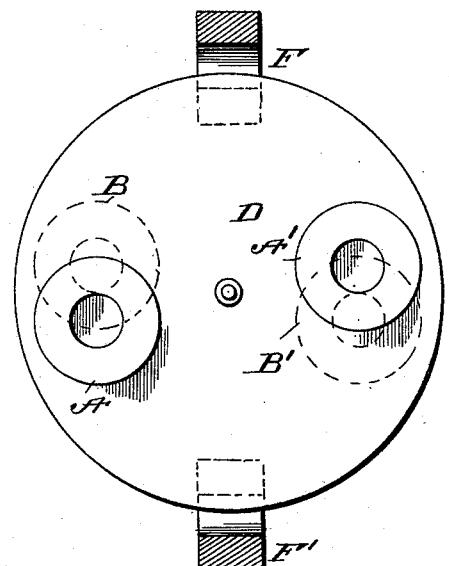
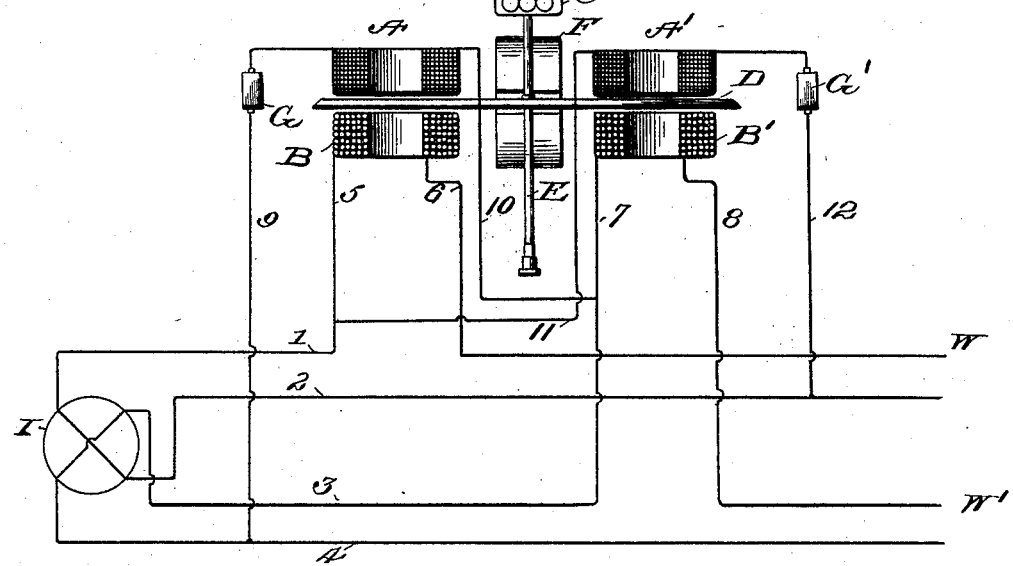
Witnesses
Inventor
Oliver B. Shallenberger
By Kerr & MacKay
Attorneys

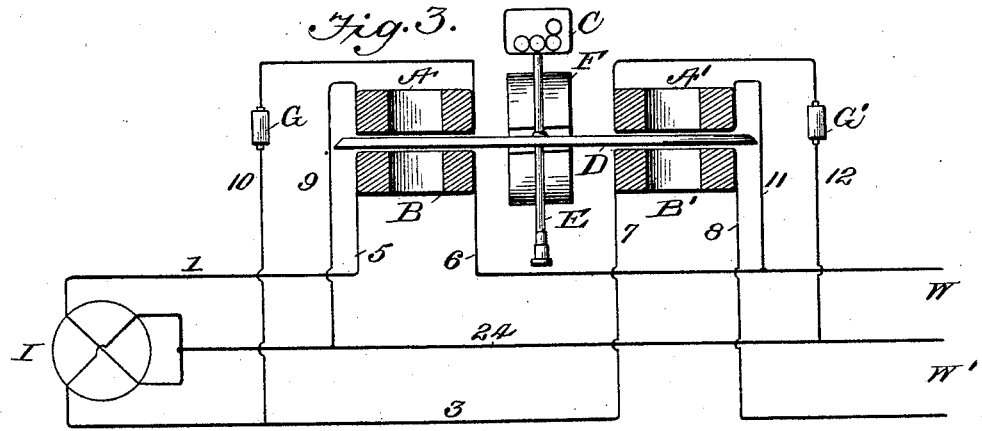
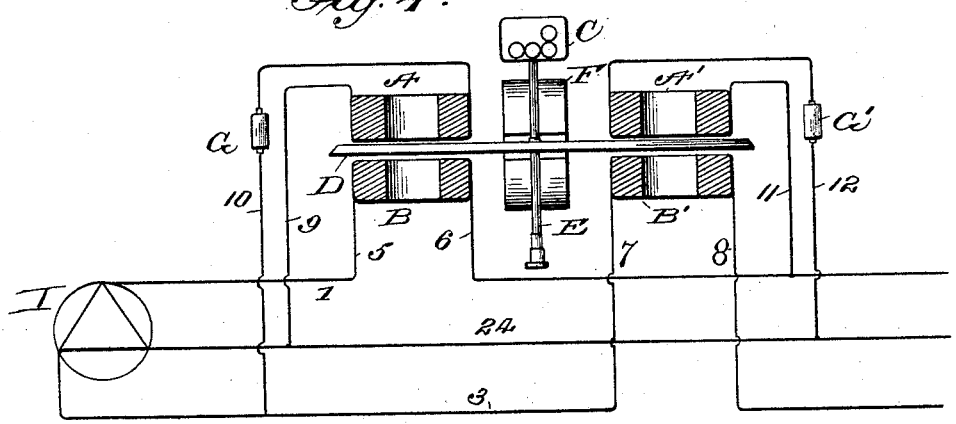
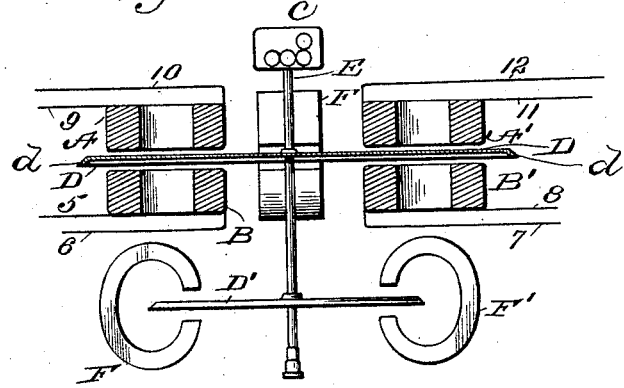

UNITED STATES PATENT OFFICE.

OLIVER B. SHALLENBERGER, OF ROCHESTER, PENNSYLVANIA.

WATT METER FOR MULTIPHASE ALTERNATING ELECTRIC CURRENTS.

SPECIFICATION forming part of Letters Patent No. 531,869, dated January 1, 1895.

Original application filed September 19, 1894, Serial No. 523,515. Divided and this application filed November 24, 1894. Serial No. 529,874. (No model.)

*To all whom it may concern:*

Be it known that I, OLIVER B. SHALLENBERGER, a citizen of the United States, residing at Rochester, county of Beaver, State of Pennsylvania, have invented certain new and useful Improvements in Watt Meters for Multiphase Alternating Electric Currents; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the measurement of alternating electric currents, and it has for its object the provision of a method of and an apparatus for measuring, indicating, registering or recording the actual energy transmitted by alternating currents, which shall be simple and efficient and of wide application.

The invention is particularly applicable to the measurement of multiphase alternating currents.

I have demonstrated by experiment that if a closed conducting circuit of suitable form, mounted so as to be free to rotate, be placed in proper inductive relation to two alternating magnetic fields of the same periodicity, a torque is produced which is proportional to the product of three elements; namely, the strengths of the respective magnetic fields and a function approximating the sine of the angle representing the difference of phase between them. Following this principle, I have devised a method of and an apparatus for measuring accurately the amount of energy transmitted by two-phase or other multiphase alternating currents.

In another application filed by me September 19, 1894, Serial No. 523,515, of which this application is a division I have described a form of apparatus in which two actuating coils are inductively related to a movable element, one of said coils being supplied with current proportional to that in the work circuit, and the other with current proportional to and in quadrature with the electromotive force impressed upon the work circuit, the current in these coils producing a resultant shifting field, within which an armature is thereby caused to rotate. The torque thus produced is proportional to the energy transmitted to the work circuit. A retarding force is applied, such as that produced by the motion of a closed conductor in a constant magnetic field, which is proportional to the velocity of rotation, so that the total movement during an interval of time is directly proportional to the time intregal of the energy transmitted, and it may be recorded in any convenient manner.

The present invention relates more particularly to an organization adapted for the measurement of the energy transmitted over the branches of multiphase circuits by the addition in a single instrument of effects proportional to the energy of the individual circuits.

In the accompanying drawings, Figure 1 illustrates the relation of the actuating parts of the meter. Fig. 2 is a diagram showing the connection of the meter in a two-phase four-wire circuit. Fig. 3 illustrates the invention as employed in connection with two-phase three-wire circuits. Fig. 4 illustrates a similar connection as applied to three-phase three-wire circuits. Fig. 5 illustrates a modification of form.

Referring to the drawings, A and A' represent two inducing coils of comparatively small wire connected in shunt by means of wires 9, 10 and 11, 12 respectively.

B, B' are inducing coils of relatively large wire connected in series with the work circuits by the wires 5, 6, and 7, 8 respectively.

Between the coils A, A' and the coils B B', is located a disk D of thin aluminium, copper, or other conducting metal, mounted rigidly upon the shaft E, which is free to rotate with a very small amount of friction. I have found that almost any metal of reasonably high conductivity is suitable in the construction of the disk, but aluminium has certain advantages on account of its high conductivity relatively to its weight, so that the disk may be made sufficiently rigid without introducing excessive friction and without liability of injury to the bearings. A simple flat disk may be used, but in order to increase its rigidity I have found it desirable to turn over the edge as shown at $d$, by which means the vibration due to the alternating current is suppressed. Suitable counting or registering mechanism C is geared to the upper end of the shaft.

F and F' are permanent magnets between the poles of which the disk moves, its rotation being retarded by the eddy currents induced in it. These magnets should be so proportioned in strength to the maximum torque exerted upon the disk that the resulting speed is slow relatively to that of synchronism, and also sufficiently slow to avoid appreciable resistance due to motion through the air.

Non-inductive resistance coils G and G' are connected in series with the shunt coils A and A' respectively, and may be adjustable. By this means the resistances of these circuits are made high relatively to their self inductions, and consequently the currents therein are practically in phase with the electro-motive forces impressed upon them.

It is important to so locate the coils A and A' with reference to the coils B and B' that the currents induced in the disk D by the coils A and A' shall be within the magnetic fields of the coils B and B' respectively, and vice versa.

If the electro-motive force be impressed upon each of the shunt circuits including the coils A and A' in quadrature with the currents in the corresponding series coils B and B' when there is no lag in the work circuits which include the coils B and B', then under varying conditions of lag in the work circuit the torque upon the disk D will be proportional to the energy transmitted.

In the drawings I have illustrated the manner of connecting the instrument with three typical systems of multiphase circuits commonly employed in power transmission.

Fig. 2 shows the meter in connection with a four-wire two-phase system, in which I represents a generator of two-phase currents transmitted over the lines 1, 2, 3, 4, to the work circuits W, W'. The shunt coil A is connected across the circuit 4, 3, by the wires 9, 10. The corresponding series coil B is connected in the line 1, by the wires 5, 6. The shunt coil A' is connected across the circuit 1, 2 by the wires 11, 12. The corresponding series coil B' is connected in the line 3, by the wires 7, 8. The electro-motive force impressed upon the coil A is therefore in quadrature with that impressed upon the circuit 1, 2, including the coil B, and in like manner the electro-motive force impressed upon the coil A' is in quadrature with that impressed upon the circuit 3, 4, which includes the coil B'. These electro-motive forces are practically equal under usual conditions. The coils A and B produce a torque therefore proportional to the energy transmitted over the circuit 1, 2, independently of the coils A' B'. In like manner the coils A' B' produce a torque proportional to the energy transmitted over the circuit 3, 4. The combined effect upon the armature is therefore equal to the sum of two separate actions, producing a torque, and consequently a registration or indication, proportional to the whole energy transmitted. It is important that the coils A and A' be so located that no torque is produced by currents of different phase in them alone, and also that the coils B and B' be so located that they alone produce no torque, since such action would vary as the product of the currents in the coils A, A', and not in proportion to the energy transmitted, which is equal to the sum of that transmitted over the respective circuits. Fig. 1 illustrates such an arrangement of the coils as described, the coils being placed upon diametrically opposite sides of the shaft.

Fig. 3 illustrates the meter in connection with a three-wire two-phase system, in which two electro-motive forces in quadrature are generated by the generator I and transmitted over the circuits 1, 24 and 3, 24, to the work circuits W and W'. The connection of the actuating coils of the meter with the circuits, is, as will be seen by reference to the drawings, practically the same as in Fig. 2, with the exception that the conductors 9 and 12 lead to the conductor 24, which replaces the separate conductors 2 and 4 of Fig. 2.

Fig. 4 illustrates the meter in connection with a three-wire three-phase system, in which the three electro-motive forces are one hundred and twenty degrees apart, the generator I being connected to the work-circuits by the conductors 1, 3 and 24. The connections of the meter circuits is the same as described in connection with Fig. 3. The same relations of electro-motive forces exist so far as the meter is concerned in this organization as described with reference to Fig. 3, so that although the difference of phase between the impressed electromotive forces upon the three branches is one hundred and twenty degrees, that between the circuits including the respective coils A and B is ninety degrees, and likewise that between the circuits including the coils A' and B' is ninety degrees.

It will be understood that the constant of the meter must be adjusted to suit the requirements of any particular method of connection in the circuits. While the indications of any given meter if connected in various ways, would be proportional to the energy transmitted, it might require the application of a coefficient, depending for its value upon the known conditions. It is usually more convenient in practice to design the meter with reference to its proposed use, so that it will directly indicate the energy transmitted.

Instead of employing the disk D as a retarding member of the meter, a separate disk D' may be used as shown in Fig. 5. The disk D' is shown as mounted upon the shaft E and the retarding magnets F, F' applied thereto. It is of advantage to construct the disk D' of a metal the electrical resistance of which has approximately the same temperature coefficient as that of the armature, so that the retarding effect will be varied by changes of temperature of the surrounding air in the same ratio as the variations of torque on the armature from the same cause.

In Watt meters of ordinary construction it is customary to connect one set of coils in series with the work circuit, and an armature carrying another set of coils in shunt to the same circuit through a suitable resistance, the deflection or speed being then proportional to the power transmitted, and a maximum when the shunt and series currents are in the same phase. I have reversed the usual conditions as to the phase relation between the currents in the shunt and series coils, and in the meter herein described the torque is zero when the two currents are in the same phase, and is a maximum when the currents are a quarter period apart. This being the case, I connect the shunt coil in a circuit so organized that the current in it differs in phase a quarter period from the impressed electromotive force in the series circuit, and is proportional in amount to that electromotive force, under which conditions a maximum indication is given when there is no lag in the work circuit, the shunt and series currents being than a quarter period apart. If, now, the work current is caused to lag from this normal relation, by the presence of an inductive load, the shunt and series currents approach each other in phase, giving a diminishing indication of the meter, and if the lag amounts to a quarter wave length, so that no work is being done in the circuit, the series current is in phase with the shunt current and no rotation is produced. The torque for any given current and electromotive force is, in fact, proportional to the sine of the angle representing the displacement of phase between the currents in the shunt and series coils, which under the conditions here stated is equal to the cosine of the lag angle in the work circuit. Since the torque is also directly proportional to the product of the currents in the shunt and series coils, it is directly proportional to the power transmitted, and the retarding force being proportional to the speed, the registration is also directly proportional to the power transmitted. Each set of coils A, B, and A', B', operates in accordance with the foregoing explanation, and the total torque upon the disk is equal to the sum of the torques separately exerted by the coils A, B, and by the coils A', B'. The retarding effects produced by the magnets F, F', are directly proportional to the rate of rotation of the armature so that the registration is directly proportional to the energy transmitted.

The specific form of apparatus shown and described and the methods of connecting the meter therewith are illustrative of my invention, and its applications, and I do not desire to be limited to the precise form or arrangement of any of the parts. Moreover, there are various fundamental features of the invention which are applicable to other uses than strictly energy meters. For instance, they may be adapted for use with indicating or recording Watt meters, volt meters and ammeters. Electric meters have been heretofore proposed or constructed in which it has been erroneously assumed that rotation may be produced by the action of alternating magnetic fields differing in phase, but without producing a resultant shifting field, or its equivalent, and in various other ways.

I do not limit myself to any particular theory of the inductive phenomena by which rotation is produced, and while I have herein described and claimed as my invention certain specific forms of apparatus, and improvements therein, I may nevertheless employ the other more general features of my invention in connection with any form of apparatus capable of securing the same results as the apparatus herein described.

I claim as my invention—

1. In an electric meter, an actuating device responding to the currents transmitted over two or more circuits, consisting of an armature and two independently operating sets of actuating coils, each set comprising a series coil connected in one circuit and a shunt coil connected across another circuit.

2. The combination with the circuits of a multiphase system of distribution, of an electric meter, the actuating portion of which includes an armature and separate sets of independently operating actuating coils, each set comprising a coil depending for its actuating effects upon the current transmitted over one branch of the circuit independently of that transmitted over the other branches.

3. In an alternating current electric meter for measuring energy transmitted over two or more circuits, the combination of a counting or registering device and an actuating device therefor consisting of an armature and two or more independent sets of actuating coils, each set dependent for its operation upon currents differing in phase, and comprising a coil connected in shunt upon one circuit and a coil connected in series with another circuit.

4. The combination with circuits upon which the impressed electromotive forces are in quadrature, of a meter, the actuating device of which consists of an armature, its shaft, and two sets of actuating coils each comprising a shunt-connected and a series-connected coil, the shunt-connected coils being upon opposite sides of the shaft, and the series-connected coils being likewise upon opposite sides of the shaft but having their axes in different radial lines from the shunt-connected coils.

5. The combination with a three-wire multiphase system of alternating current distribution, of a meter having two sets of actuating coils, each set comprising a shunt-connected and a series-connected coil, the two series-connected coils being connected respectively in two of the three wires and the shunt-connected coils being connected respectively between the third wire and the wire with which the corresponding series-connected coil is not connected.

6. The combination with a three-wire multiphase system of alternating current distribution, of a meter comprising an armature, a series-connected coil in one wire, a shunt-connected coil connected between the second and third wires, said coils being so related as to produce a shifting field when traversed by alternating currents differing in phase to the effects of which said armature is subjected, a series-connected coil connected in the said second wire, a shunt-connected coil connected between the first-named wire and said third wire, the last-named shunt- and series-connected coils being related to each other and to said armature in the same manner as the first-named coils, and the two sets of coils so located with reference to each other as to independently affect said armature, a retarding device, and a counting, registering or indicating device operated by said movements of said armature.

7. The combination of a multiphase system of alternating current distribution, and a meter for measuring the energy transmitted over the system consisting of an armature and two sets of actuating coils therefor, each set comprising a shunt and a series coil, the shunt coils being respectively connected across different branches of the system, and each series coil being connected in a branch other than that between which its corresponding shunt coil is connected, said sets of coils acting independently to impel the armature, a retarding device for modifying the movement of the armature, and a counting, registering or indicating device operated by the movements of the armature.

8. The combination with a multiphase system of alternating current distribution, of an armature and two sets of actuating coils therefor, each set comprising a shunt coil and a series coil, connections across different branches of the system including the respective shunt coils, each series coil being included in a branch of the system other than that between which its corresponding shunt coil is connected.

9. In an electric meter, an armature and two sets of actuating coils, each set comprising a shunt-connected coil and a series-connected coil, the two shunt-connected coils so related to each other and to the armature as to produce no resultant torque upon the armature by reason of currents differing in phase traversing those coils alone, and the two series-connected coils likewise so related to each other and to the armature as to produce no resultant torque upon the armature by reason of currents differing in phase traversing those coils alone, each set of coils depending for its action upon currents differing in phase traversing the respective coils of that set.

10. In an electric meter for alternating currents, an armature having a closed conducting circuit, and a retarding device having a closed conducting circuit in which currents are induced by its own motion, the temperature coefficients of the two conducting circuits with reference to electrical resistance being approximately the same.

In testimony whereof I hereunto affix my signature in presence of two witnesses.

OLIVER B. SHALLENBERGER.

Witnesses:
GRACE M. FINLEY,
CHARLES A. TERRY.